United States Patent [19]
Bourgeois

[11] 3,822,890
[45] July 9, 1974

[54] BEARING SEALS
[75] Inventor: Claude Raymond Bourgeois, Annecy, France
[73] Assignee: Societe Nouvelle De Roulements, Annecy, France
[22] Filed: Jan. 15, 1973
[21] Appl. No.: 323,724

[52] U.S. Cl. ................................. 277/65, 277/82
[51] Int. Cl. ............................................ F16j 15/34
[58] Field of Search ............ 277/65, 81, 95, 47, 48; 308/187.1, 187.2

[56] References Cited
UNITED STATES PATENTS
| | | | |
|---|---|---|---|
| 2,993,711 | 7/1961 | Peras | 277/65 |
| 3,363,911 | 1/1968 | McKinven | 277/65 |
| 3,511,513 | 5/1970 | Dahlheimer | 277/65 |

FOREIGN PATENTS OR APPLICATIONS
| | | | |
|---|---|---|---|
| 1,102,303 | 2/1968 | Great Britain | 277/65 |

Primary Examiner—Samuel B. Rothberg
Assistant Examiner—Robert I. Smith
Attorney, Agent, or Firm—Stevens, Davis, Miller & Mosher

[57] ABSTRACT

Seal for rolling-contact bearing, of the type adapted to be fitted in the outer race thereof or in a cavity intended for said bearing, which comprises two sealing lips directed the one radially towards the inner race and the other axially outwards of the seal and bearing assembly. The outer axial lip has a flattened triangular configuration and the edge having the smallest acute angle of this lip acts as a frictional contact element, the edge having the largest acute angle constituting a kind of circular hinge interconnecting the seal body and said lip, the circular edge of obtuse angle creating a reinforcing area between the edges of said lip, its width corresponding to about five times its thickness and its inclination corresponding to about 10° to about 60° in relation to the bearing axis. This seal is also applicable to other rotating members.

8 Claims, 6 Drawing Figures

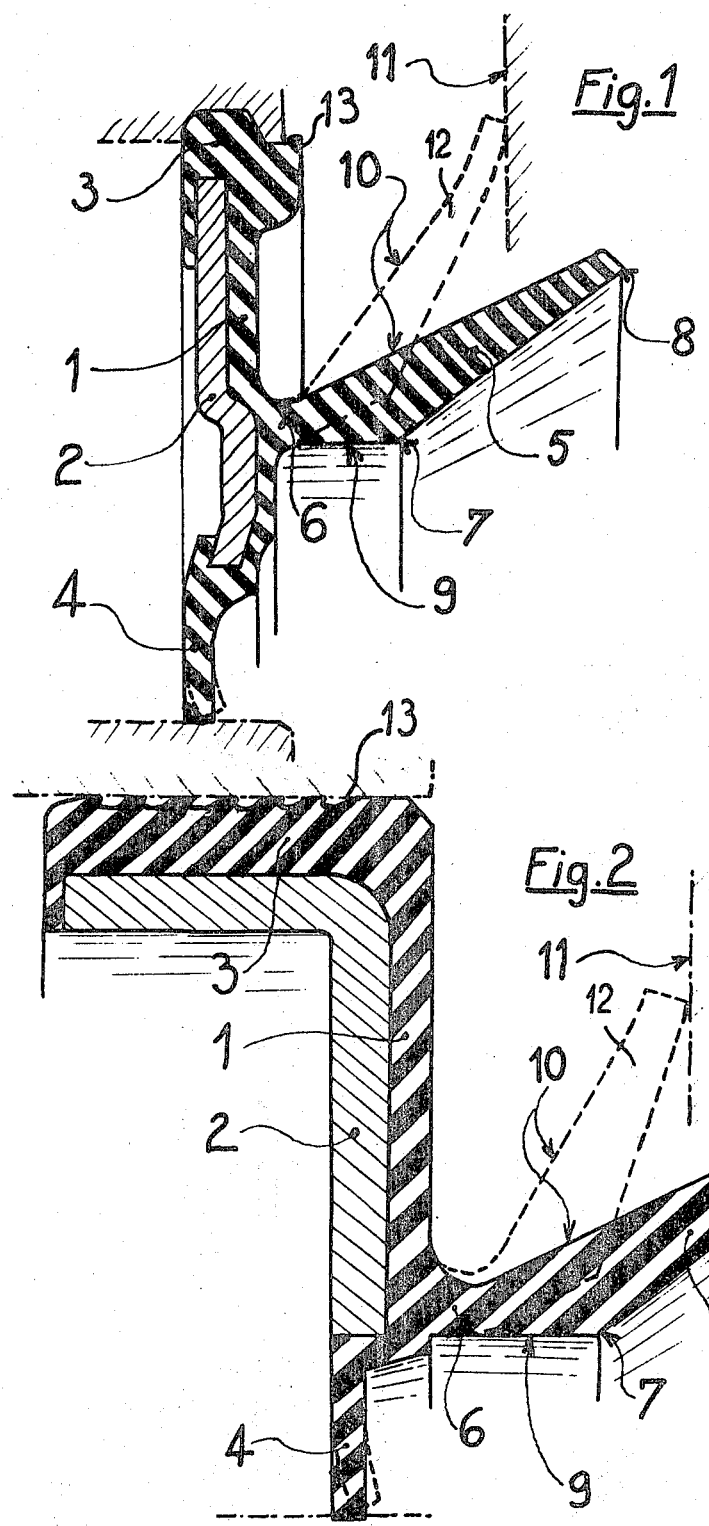

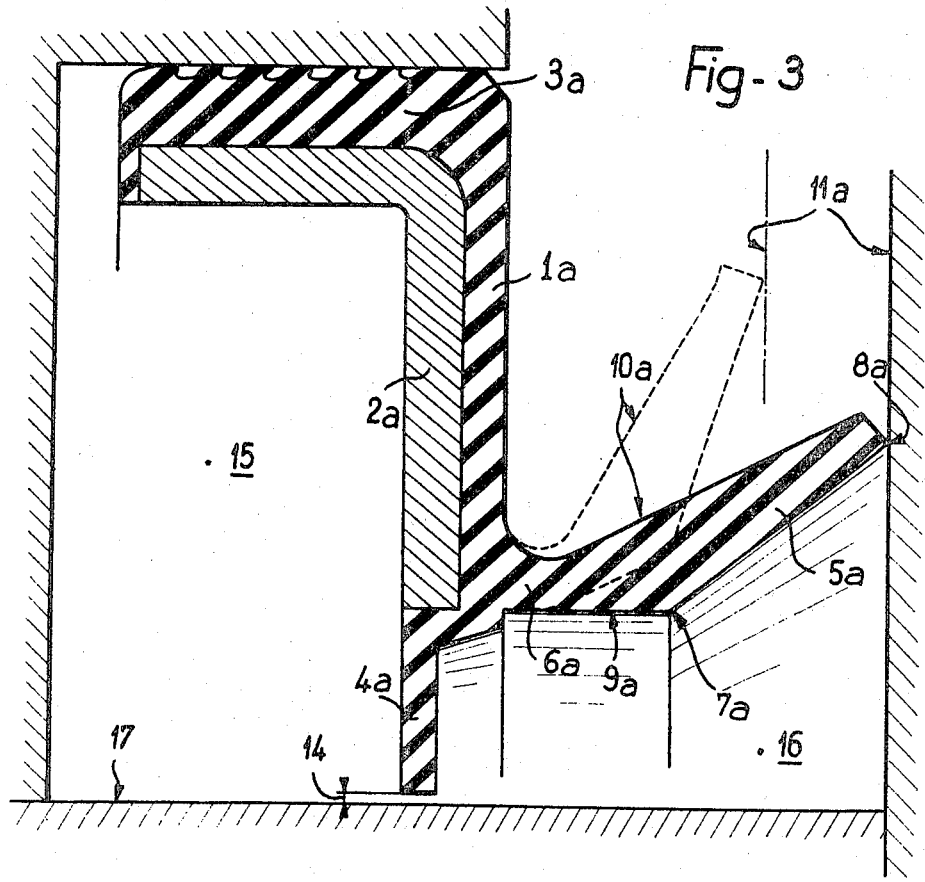
Fig-3
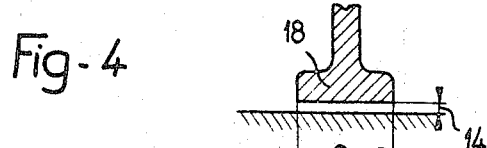
Fig-4
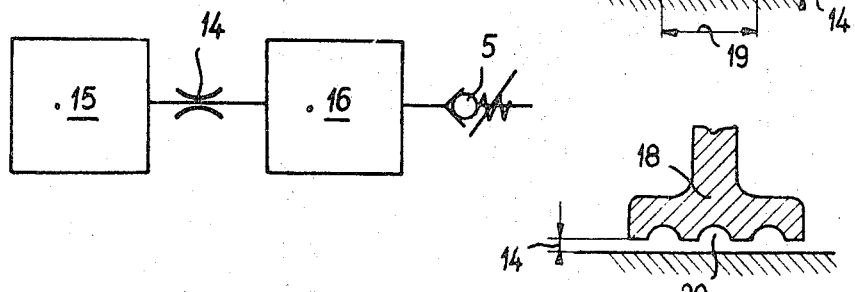
Fig-5
Fig-6

BEARING SEALS

This invention relates to a seal for rolling-contact bearing, with or without metal reinforcing member crimped in a body of synthetic material such as an elastomer comprising two friction lips, fitted in the outer race of the bearing, or in the cavity receiving this bearing.

The chief drawback of many hitherto known bearing seals of this character is to correspond to a well-defined mounting or assembling structure, and to be therefore not adapted to be fitted to different mounting or assembling structures in the case of standard bearings of a corresponding diameter.

Thus, flat reinforced seals having a single lip on the inner diameter are known, which are snap-fitted in a groove formed in the bore of the inner race, the seal lip engaging an outer bevel of the inner race. This protection device is advantageous in that it is specific to the bearing and independent of the mounting conditions, but it proved inadequate in actual practice for preventing the ingress of dust particles and fluids.

It is also known, notably through the U.S. Pats. No. 3,601,411 of Aug. 24, 1971 and No. 3,639,016 of Feb. 1, 1972, to provide bearing seals of which a flexible friction lip directed axially outwards to form a divergent cone engages a deflection surface possibly associated with a radial lip of the preceding type, thus providing, in conjunction with a closed space adapted to be filled with lubricant, a sufficient protection against the ingress of dust particles and external impurities, due to the presence of its two sealing lips. However, seals of this character are adapted to specific bearing types, under specific mounting and assembling conditions, for example the provision of lip bearing surfaces located at an accurately-defined distance from the seal in order to obtain a satisfactory sealing property of said lips.

Therefore, these bearing surfaces must be obtained by machining the adjacent members or in the form of deflecting sheet-metal inserts.

It is the chief object of the present invention to avoid these drawbacks while obtaining satisfactory sealing properties and an easy adaptation of the seal to a wide range of mounting conditions of standard bearings on which the seal is fitted in the known fashion by simple insertion or snap engagement in the bore of the outer race or in the bearing-receiving cavity.

This seal consists of a bearing seal with or without a circular metal reinforcing member crimped in an elastomer casing or a casing of any equivalent product, this seal comprising two lips directed the one radially in a plane perpendicular to the bearing axis so as to bear against the outer contour of the inner race, the other axially outwards to form a divergent cone, and being characterised in that said outer lip has a flattened triangular cross-sectional contour with the edge having the smallest angle adapted to constitute the frictional lip and the opposite largest acute angle adapted to constitute the hinge connecting said lip to the seal body, the circular edge having an obtuse angle constituting a central reinforcing portion, the ratio of the width of said lip to its maximum thickness being greater than five, and its inclination along a divergent cone corresponding to an angle of 10° to 60° with respect to the bearing axis.

As a result of this specific lip configuration the frictional or bearing condition of its outer edge and therefore its sealing properties are not subordinate to the degree of compression of said lip against its bearing surface, i.e. to the distance from this bearing surface to the seal.

As a consequence of the flexure rigidity obtained in the central portion of the seal which is due to its flat triangular cross-sectional contour, the compression action will produce essentially a pivoting movement of the lip about its edge connecting same to the seal body which edge is rendered more deformable by its reduced thickness and its compression, whereas, in contrast thereto, the tensioning thereof as a consequence of the increment in the diameter of its outer edge will increase its rigidity, and its bearing contact with the deflection surface will cause only a slight flexion and a moderate bearing and sealing pressure.

Thus, the absence of a gradually increasing compression flexion permits of providing lips of relatively great length, according to this invention, which can be adapted to bearing surfaces located at considerably variable spacings from the seal, and therefore to greatly diversified mounting conditions while maintaining satisfactory seal bearing conditions.

Several exemplary forms of embodiment of seals according to this invention will now be described with reference to the attached drawings showing various cross-sectional contour of such seals on a considerably enlarged scale in order to afford a clear understanding of the lip shapes according to this invention. In the drawings:

FIG. 1 illustrates a characteristic contour of a snap-fitting seal adapted to engage a groove formed in the bore of an outer bearing race;

FIG. 2 is a similar view but showing a modified form of embodiment wherein the seal is fitted by force-fitting in a bore of corresponding diameter;

FIG. 3 illustrates the contour of another form of embodiment wherein the radial lip of the seal has a calibrated clearance in relation to the registering surface;

FIG. 4 is a pneumatic equivalent functional diagram illustrating the seal of the form of embodiment shown in FIG. 3 and the various spaces bounded thereby, and FIGS. 5 and 6 are detail views showing modified forms of embodiment of the radial lip edge in the case of FIG. 3.

The seals illustrated in FIGS. 1 to 3 of the drawings comprise a body 1 of synthetic rubber which partially surrounds a metal reinforcing member 2 and having its outer edge 3 shaped to correspond to the contour of a snap fitting groove (FIG. 1) or to a force-fitting in a bore (FIGS. 2 and 3), this last modification being applicable notably to roller-bearings whereas the one shown in FIG. 1 is applicable more particularly to ball-bearings.

The body 1 has a lip-forming inner radial extension 4 disposed in a plane substantially perpendicular to the bearing axis; this lip 4 is adapted to engage the outer contour of the inner race of the bearing, thus forming the first frictional-contact sealing assembly.

The outer sealing lip 5 has a flattened substantially triangular cross-sectional contour or configuration and is connected to the main body 1 of the seal through an annular portion 6 of relatively reduced cross-section constituting a kind of hinge adjacent the obtuse angle or edge 7 reinforcing the opposite edge 8 constituting the external sealing lip proper. The elastomer or any other equivalent product will have the Shore hardness required to provide the desired and necessary elasticity and rigidity. In the case of an elastomer a 80 Shore hardness may be adequate for the purpose.

The circular surface 9 of this lip will advantageously be cylindrical in order to facilitate the stripping of the seal from its mould and ensure the maximum reinforcing effect on lip 5, whereas the top surface 10 of this lip will form a divergent taper from said hinge 6 and an angle of 10° to 60° with respect to the bearing axis.

The length of said lip 5 between its inner end 6 and its outer end 8 will be of the order of at least five times its maximum thickness measured across the edge 7.

When fitting the seal in position, the lip 5 will yield about its circular hinge 6 and its sealing edge 8 will engage the bearing surface 11 (FIGS. 1 and 2) to assume a shape 12 shown in dash lines.

In contrast with higherto known seal or packing lips, which when compressed are flexed by being bent more or less, thus entailing a greater frictional force and a rapid wear and tear, the seal lip according to this invention is kept in linear contact through its circular edge 8 under a substantially constant pressure irrespective of the degree of flattening applied to the taper of lip 5, i.e. the distance from the bearing surface 11 to the seal body 1, within the limits set by the dimensions of said lip 5.

This remarkable result is due to the particular shape of said lip 5, which in the hinge or root area 6 combines compressive and flexion movements, thus concentrating the flexion distortion in this area while cancelling the resistance of the other areas subjected to a flexion distortion.

At the same time, the increment in diameter in the outer area 8 is attended by its elongation and tensioning. This tensioning exerts on the lip a binding effect assisting in compressing the area 6 while facilitating its flexion, with a moderate and substantially constant bearing reaction against the surface 11, irrespective of the distance from the seal body 1.

Thus, similar sealing and frictional conditions are obtained for a same seal, through a wide range of mounting and fitting conditions.

In the case illustrated in FIG. 1, the seal projects with its face 13 from the cavity receiving the bearing race and has a diameter slightly greater than the diameter of this cavity. When fitting the seal in position, the seal is thus clamped between the corresponding groove and the shoulder engaged by the bearing, and therefore a greater contact area is obtained. Furthermore, the risk of causing the seal to be rotatably driven as a consequence of the frictional torque produced on the lips is reduced considerably.

In the case illustrated in FIG. 2 the same problem is solved by increasing the contact area and the provision of grooves facilitating the positioning while counteracting any attempt to remove the seal from its cavity. These grooves afford a greater surface compression of the seal material, thus increasing its bearing pressure.

The lip configuration according to this invention permits of easily coating, for example by dipping into another material, the sealing edge 8. Thus, specific properties may be imparted to these lips, notably as far as frictional contact, wear and temperature resistance are concerned.

As already mentioned in the foregoing, the absence of progressive compression flexion of these seals permits of forming relatively long lips adapted to engage bearing surfaces located at considerably variable distances from the seal while maintaining satisfactory contact and sealing conditions, notably in the presence of gases, notwithstanding the frictional character of the sealing contact. This property is advantageously exploited in the form of embodiment shown in FIG. 3 illustrating the fitting of bearings in closed chambers in which overheating of the trapped air is liable to occur during the operation so as to expand and produce an overpressure detrimental to the proper bearing operation, unless this air can escape through an orifice provided to this end.

The seal according to this invention as illustrated in FIG. 3 is adapted efficiently to limit the inconveniences of this known effect without resorting to other specific means when mounting the bearing.

It is remarkable notable in that a limited clearance is provided between the end of its radial lip extending in a plane perpendicular to the bearing axis and the registering surface associated with the inner race of said bearing. Thus, when a bearing operates in a closed space sealed by a seal according to this invention, the valve-like operation of this device is regularized.

When starting the operation of the machine incorporating the bearing and seal of this invention, the air at room temperature and pressure which is trapped in the cavity is heated, and thus caused to expand, and the clearance provided between the end of the radial lip and the registering surface associated with the inner race of the bearing permits the escape of expanded air through the seal and the bearing edge of the axial lip, thus limiting the overpressure. When the cooling phase begins, the contraction of the previously expanded air produces a vacuum effect in the bearing retained in position by the action of the axial lip acting as a suction-cup.

Under these conditions, it is clear that the seal shown in FIG. 3, which comprises in combination an axial lip similar to that of the seal of FIGS. 1 and 2, and a radial lip having a calibrated play with respect to the registering surface of the bearing, will produce a valve effect limiting the value of the possible overpressure during the operation of the assembly, as well as the vacuum in the inoperative condition, in the bearing cavity. The intermediate chamber formed by the gap existing between the two lips constitutes a buffer capacity ensuring, after a first operation and the creation of a negative pressure in the bearing cavity, closed by the pressing of the suction-cup forming axial lip against the bearing surface, an absorption of the expansion and contraction of the air in said cavity, without producing further lifting movements of the axial lip and impairing the sealing action.

According to the specific case contemplated, this result may be obtained by adjusting the clearance between the radial lip and the registering surface associated with the inner bearing race, thus forming a throttling passage producing a preset loss of pressure between the volume of the bearing cavity and the volume or buffer capacity of the seal. This throttled passage will preserve the buffer capacity against any sudden pressure variation and consequently against any abnormal bearing or lifting effort exerted on the valve-forming axial lip.

On the other hand it will be seen that the parameters concerning this lip such as its angle of inclination and its length, as well as the viscosity of the lubricant involved, will permit of adjusting the permissible overpressure value attainable during the operation of the device, as well as the negative pressure (in the inoperative condition) in the various capacities or chambers of the bearing or bearings and seal or seals.

Referring to FIG. 3, it will be seen that a seal of the type described in FIGS. 1 and 2 comprises in this modified form of embodiment a body 1a and a reinforcing member 2a fitted in its cavity formed inside its outer surface 3a, with a radial lip extension 4a (extending in a plane perpendicular to the bearing axis), and on the other hand an axial lip 5a having a flattened triangular sectional contour (6a, 7a, 8a, 9a and 10a) adapted to be flexed about its hinge 6a and bearing with its outer lip edge 8a against the bearing surface 11a.

According to this invention, a radial clearance 14 is provided between the lip 4a and the registering surface 17 associated with the inner bearing race. This clearance permits the communication between the closed space 15 receiving the bearing mounting and the closed space 16 bounded by the lips 4a and 5a and said surfaces 11a and 17.

The tip of the lip may have a rectangular configuration as illustrated in FIG. 3, but alternatively it may also have a different cross-sectional shape as shown in FIG. 5, with a widened inner edge portion 18 of a width 19 consistent with the desired throttling effect to be obtained with a given clearance 14. In the other modified shape shown in FIG. 6 this widened inner edge portion 18 is indented to constitute a labyrinth as at 20.

FIG. 4 illustrates the pneumatic operation diagram resulting from this specific arrangement; the pair of closed chambers 15 and 16 are interconnected by a calibrated throttling portion or passage 14, consisting of the clearance of lip 4a, the chamber 16 being furthermore provided with a calibrated nonreturn valve consisting of said lip 5a.

Thus, any sudden overpressure produced in said chamber 15 as a consequence of, say, a sudden overheating in the bearing area, will be transmitted gradually to the other chamber 16, at the expense of a momentary overpressure in chamber 15 and the axial lip 5a will be lifted off the bearing surface 11a only in case of particularly strong, accidental overheating. Under normal operating conditions, the pressure variations will be absorbed by the chamber 16 of the seal, without producing any break of continuity in the fluid-tightness of lip 5a.

The device according to FIG. 3 is also characterised by the following secondary features: it eliminates the overheating caused by the frictional contact between its radial lip and the registering bearing surface, which had the greatest magnitude due to the relative massive shape of this lip, and accordingly a nearly complete absence of wear of the radial lip; an easier fitting of the seal; the elimination of any ancillary means for venting the inner chamber to the atmosphere (such as grease valve, breather-pipe, etc.,); improved speed efficiency, without impairing the fluid-tightness. This last advantage is due on the one hand to the reduction in the frictional contacts, and therefore to a reduced overheating, and on the other hand to the "decomposition" of the space formed between the two lips whereby, while preserving the same maximum pressure in the bearing, a wide range of pressures can be absorbed, thus reducing the corresponding overheating.

Finally, it will be noted that these advantageous features are also obtained without any additional expenses, since the arrangement of FIG. 3 does not increase the manufacturing cost of the seal.

Although specific forms of embodiment of this invention have been described hereinabove and illustrated in the accompanying drawings, it will readily occur to those skilled in the art that various modifications and changes may be brought thereto without departing from the scope of the invention as set forth in the appended claims.

What is claimed as new is:

1. A seal for rolling-contact bearing which comprises a circular body of elastic material with two sealing lips, one lip constituting the extension of said body in a plane perpendicular to the bearing axis and engaging the external contour of the inner bearing race, the other lip being directed axially inwards to form a divergent cone extending from the seal body, said seal being characterised in that said external axial lip has a flattened triangular contour of which the edge having the smallest acute angle constitutes the frictional-contact element, the edge having the major acute angle constituting the circular hinge connecting the lip to the seal body, the circular edge having an obtuse angle in this lip creating a rigid reinforcing area between said edges of said lip and having a width corresponding to at least five times its maximum thickness, the inclination of said lip ranging from about 10° to about 60° with respect to the bearing axis, the outer edge of the seal body being in a manner known per se force fitted in its bore for resisting the torque tending to rotate said seal as a consequence of the frictional contact produced between its lip and the registering surface.

2. Bearing seal according to claim 1, characterised in that the inner surface of the lip which extends from said hinge portion and said obtuse angle edge is cylindrical.

3. Bearing seal according to claim 2, characterised in that the synthetic rubber material constituting the seal body has a Shore hardness of about 80.

4. Bearing seal according to claim 1, characterised in that the outer edge of the seal body has a diameter slightly greater than that of the cavity and projects slightly therefrom.

5. Bearing seal according to claim 1, characterised in that the outer axial lip is coated along its frictional-contact lip edge with a substance capable of improving its operating properties.

6. Bearing seal according to claim 1, characterised in that said radial lip constituting the inner extension of said seal body is directed at right angles to the bearing axis and mounted with a limited clearance with respect to the registering surface associated with the inner race of the bearing, said clearance constituting a calibrated throttling passage between the closed space containing the bearing and the closed volume bounded by the axial and radial lips of the seal and their associated surfaces obtained when the bearing is fitted in operative position.

7. Bearing seal according to claim 6, characterised in that the radial lip comprises a heel-forming widened inner edge of a width adapted to preset the degree of throttling action for a given radial clearance.

8. Bearing seal according to claim 7, characterised in that indentations forming a labyrinth are formed in the inner surface of said heel-forming widened edge of the radial lip adjusting the throttling clearance.

* * * * *

UNITED STATES PATENT OFFICE
CERTIFICATE OF CORRECTION

Patent No. 3,822,890              Dated  July 9, 1974

Inventor(s)     BOURGEOIS, Claude Raymond

It is certified that error appears in the above-identified patent and that said Letters Patent are hereby corrected as shown below:

In the heading of the Patent, the Foreign Application Priority Data has been omitted and should read as follows:

January 25, 1972    France    72/02.327
        July 13, 1972      France    72/25.478

Signed and sealed this 1st day of April 1975.

(SEAL)
Attest:

RUTH C. MASON
Attesting Officer

C. MARSHALL DANN
Commissioner of Patents
and Trademarks